(12) United States Patent
Jansen et al.

(10) Patent No.: US 11,802,761 B2
(45) Date of Patent: Oct. 31, 2023

(54) PERFORATED DISK FOR SELECTING LIGHT FOR AN OPTICAL IMAGING

(71) Applicant: SOLARIUS ASIA LTD., Hong Kong (CN)

(72) Inventors: Dennis Frank Jansen, Oberhausen (DE); Benjamin Stieger, Dortmund (DE)

(73) Assignee: SOLARIUS GMBH, Munich (DE)

( * ) Notice: Subject to any disclaimer, the term of this patent is extended or adjusted under 35 U.S.C. 154(b) by 420 days.

(21) Appl. No.: 17/251,758

(22) PCT Filed: Jun. 12, 2019

(86) PCT No.: PCT/IB2019/054916
§ 371 (c)(1),
(2) Date: Dec. 11, 2020

(87) PCT Pub. No.: WO2019/239347
PCT Pub. Date: Dec. 19, 2019

(65) Prior Publication Data
US 2021/0116236 A1    Apr. 22, 2021

(30) Foreign Application Priority Data

Jun. 13, 2018 (DE) .................... 10 2018 114 162.9

(51) Int. Cl.
*G01B 11/24* (2006.01)
*G02B 5/00* (2006.01)
*G02B 21/00* (2006.01)

(52) U.S. Cl.
CPC .............. *G01B 11/24* (2013.01); *G02B 5/003* (2013.01); *G02B 5/005* (2013.01); *G02B 21/0044* (2013.01)

(58) Field of Classification Search
CPC ........ G01B 11/24; G02B 5/003; G02B 5/005; G02B 21/0044
See application file for complete search history.

(56) References Cited

U.S. PATENT DOCUMENTS 4,489,239 A * 12/1984 Grant ..................... G01N 21/39
250/338.5
5,067,805 A * 11/1991 Corle ................. G02B 21/0044
359/638

(Continued)

FOREIGN PATENT DOCUMENTS

| CN | 101532958 A | 9/2009 |
| CN | 202748306 A | 2/2013 |

(Continued)

OTHER PUBLICATIONS

International Search Report of corresponding PCT/IB2019/054916, dated Oct. 28, 2019, 5 pages.

(Continued)

*Primary Examiner* — Dominic J Bologna
*Assistant Examiner* — Jarreas Underwood
(74) *Attorney, Agent, or Firm* — Lewis Roca Rothgerber Christie LLP

(57) ABSTRACT

Described is a perforated disk for selecting light for an optical imaging, in particular for an optical imaging in a confocal imaging system. The described perforated disk has an optically absorbing material, which has an absorption coefficient of at least 98%, wherein in the optically absorbing material at least one opening is present, which defines an optical passage through the perforated disk. Preferably, the optically absorbing material contains carbon nanotubes. Furthermore, there is described a (confocal) optical imaging system having such a perforated disk.

18 Claims, 2 Drawing Sheets

(56) References Cited

U.S. PATENT DOCUMENTS

| | | | |
|---|---|---|---|
| 6,426,835 B1* | 7/2002 | Endo | G02B 21/0044 359/368 |
| 7,704,402 B2* | 4/2010 | Hamamura | G02B 21/0044 216/75 |
| 8,014,053 B2* | 9/2011 | Weber | G02B 21/0044 359/368 |
| 9,612,428 B2* | 4/2017 | Palo | G02B 21/0044 |
| 2002/0060298 A1* | 5/2002 | Endo | G02B 21/0032 359/385 |
| 2002/0158268 A1* | 10/2002 | Matsuda | H01L 31/02162 257/184 |
| 2007/0081222 A1 | 4/2007 | Bartzke | |
| 2009/0126783 A1* | 5/2009 | Lin | H01L 31/0543 359/885 |
| 2009/0207468 A1* | 8/2009 | Weber | G02B 21/0044 359/234 |
| 2009/0323152 A1 | 12/2009 | Chan | |
| 2013/0171436 A1* | 7/2013 | Xiong | C08K 3/041 428/408 |
| 2016/0370566 A1* | 12/2016 | Palo | G02B 21/0076 |
| 2017/0336611 A1* | 11/2017 | Kubo | G01N 21/6458 |
| 2018/0201541 A1* | 7/2018 | March | C01B 32/00 |
| 2018/0292634 A1* | 10/2018 | Ricco | G02B 21/0044 |
| 2021/0025757 A1* | 1/2021 | Yamamoto | G01J 3/0218 |

FOREIGN PATENT DOCUMENTS

| | | | |
|---|---|---|---|
| CN | 202748306 U | * | 2/2013 |
| CN | 103063145 A | | 4/2013 |
| CN | 106324819 A | | 1/2017 |
| DE | 10014331 A1 | | 10/2000 |
| DE | 10 2013 201 857 A1 | | 1/2004 |
| DE | 103 23 923 A1 | | 12/2004 |
| EP | 1806601 A1 | | 7/2007 |
| JP | 11-218677 A | | 8/1999 |
| JP | 11218677 A | * | 8/1999 |
| WO | WO 2007/121706 A1 | | 11/2007 |
| WO | 2015/000764 A1 | | 1/2015 |
| WO | 2017/064629 A1 | | 4/2017 |

OTHER PUBLICATIONS

Written Opinion of corresponding PCT/IB2019/054916, dated Oct. 28, 2019, 5 pages.

Mcentee, "Encoded Pixels enhance microscopes'3-D images," OLE 2006: Opto & Laser Europe, 1996, 4 pages.

German Office Action, dated May 7, 2019, of corresponding DE 10 2018 114 162.9, 6 pages.

German Office Action, dated Jul. 8, 2020, of corresponding DE 10 2018 114 162.9, 6 pages.

European Search Report for Patent Application No. Jul. 13, 2021, dated Jul. 13, 2021, 9 pages.

* cited by examiner

PERFORATED DISK FOR SELECTING LIGHT FOR AN OPTICAL IMAGING

CROSS-REFERENCE TO RELATED APPLICATIONS

This application is a National Phase patent application of International Application Number PCT/IB2019/054916, filed Jun. 12, 2019, which claims the benefit of the filing date of the German Patent Application No. 10 2018 114 162.9 filed 13 Jun. 2018, the entire disclosures of which are hereby incorporated herein by reference.

TECHNICAL AREA

The present disclosure relates generally to the technical area of optical imaging by perforated disks. The present disclosure relates in particular to a (rotatable) perforated disk having a plurality of openings and optical passages, which can be introduced as small pinholes in the path of rays of an optical imaging system. Furthermore, the present disclosure relates to an optical imaging system having such a perforated disk.

BACKGROUND

In the area of the optical image transmission, rotating perforated disks are used regularly in order to enable a well-focused imaging in a precisely defined distance plane. Such perforated disks are, for example, so-called "Nipkow-disks" or so-called "Multi-Pinhole-Disks". In order to enable a three-dimensional imaging of a surface, individual surface layers must firstly be recorded physically separately from each other, which are then assembled to 3D surface topographies via data processing measures. Herein, different surface layers can be captured by a suitable change of the distance between an object to be optically captured and at least a part of a corresponding optical measurement system, wherein a perforated disk represents one component of an optical imaging system of this measurement system.

In 2D and 3D microscopes, which work confocally, perforated disks serve to blank out the light that is reflected from the surface to be captured in the sense of a dynamic aperture, which light is not located within a defined focus region of the imaging system. By such a spatial filtering of the reflected light, defined sectional images of a surface can be generated, which can be assembled to a 3D surface topography.

Perforated disks are usually manufactured from an optically transparent material, such as for example glass, which is covered by a reflecting layer. In the reflecting layer, there are openings, each of which represents a pinhole (or aperture). Herein, this reflecting layer regularly causes interfering light, which is emitted back from the perforated disk itself and not from the object to be investigated, and impinges on a light detector, which captures the so-called utilized light. The utilized light is that light which is emitted back from the object to be investigated, and which shall be evaluated. In unfavourable cases, the interfering light may be more intense than the utilized light by orders of magnitudes. Then, it will become difficult or even impossible to measure the surface of the object to be investigated with an acceptable accuracy. In addition, a perforated disk made of an optically transparent material represents in the path of rays (or beam path) a plane-parallel plate, which results in an optical offset for all rays that do not impinge perpendicular, and thus to geometric aberrations (or geometric image defects). Furthermore, also chromatic aberrations (or chromatic image defects) occur (due to a dispersion of the optically transparent material). Furthermore, reflexes are generated also at the optically transparent material itself, such that the transmission through such a perforated disk is below 100%, because light intensity is lost due to such reflections.

The openings of the pinholes are generally arranged on concentric circles, wherein the polar angle thereof is subject to a statistical distribution, as is described for example in WO 2007 121706 A1. Alternatively, the openings may be spatially distributed on logarithmic spirals, wherein an origin of coordinates of the distribution is located in the center of the perforated disk. However, an arrangement of the openings on concentric circles leads to visible rings in the optical imaging, an arrangement on logarithmic spirals produces a light intensity that decays towards the image border.

In order to avoid undesired reflections at the perforated disk, which might outshine the utilized light, one generally falls back to two approaches.

(A) A first approach consists in tilting the perforated disk in the optical path of rays by an angle, which differs sufficiently from 90°. Then, the reflected interfering light "takes" a different path than the utilized light and can be coupled out of the path of rays. An undesired consequence of such a tilting consists in that in consequence all optical elements in the corresponding imaging system have to be set inclinedly, which in turn results in an asymmetry of the optical imaging and thus to a further geometric and chromatic aberrations.

(B) A second approach consists in using, alternatively to or in combination with the first approach, a so-called polarization optical system for reducing reflexes. Herein, the light is polarized such that the polarization of the reflexes from the perforated disk is perpendicular to the polarization of the utilized light, which emits back from the surface to be measured into the imaging system, and which is captured by a light detector. By a polarization filter, components of the interfering light, which stem from the back reflexes on the perforated disk, can be blanked out (or removed). However, this polarization-based approach is limited in its effect, because it presupposes that the whole imaging is polarization-preserving. Because this assumption does not apply completely, the interfering light can be blanked out only to a part.

Embodiments of the invention are based on the object to establish a perforated disk, which does not result in aberrations in optical imaging, and which avoids interfering light generated by reflections and/or scatterings at the perforated disk.

SUMMARY

This object is solved by the subject of the independent patent claims. Preferred embodiments of the present invention are described in the dependent claims.

According to a first aspect, there is described a perforated disk for selecting light for an optical imaging, in particular for an optical imaging in a confocal imaging system. The described perforated disk has an optically absorbing material, which has an absorption coefficient of at least 98%, wherein at least one opening, which defines an optical passage through the perforated disk, is present in the optically absorbing material.

The described perforated disk is based on the insight that by the use of a material having a very high absorption coefficient, undesired reflections at the surface of the perforated disk (outside of the opening) can be avoided to a far extent. Thereby, the above-described disadvantages of known perforated disks can be avoided in an effective manner. In particular, the light, which impinges on the perforated disk outside of the at least one opening, is absorbed so strongly that an inclination of the perforated disk and/or the use of polarization optical systems for avoiding interfering light is not necessary, because only extremely little light is reflected (back) and/or backscattered at the surface of the material. Herein, the expression "little light" relates to the intensity of the light that is not absorbed and/or the light radiation that is not absorbed.

According to embodiments of the invention, the predominant part of the light that impinges on the perforated disk (outside of the opening) is thus absorbed. This means that the portion, which is not absorbed, either penetrates (transmits) the optically absorbing material and/or is scattered (back) at the surface of the material. Since a transmission of light (outside of the opening) is even more detrimental for most optical imagings than a back reflection and/or backscattering, care can preferably be taken to the extent that the transmission coefficient of the optically absorbing material is as low as possible. A transmission coefficient of at least approximately zero can be achieved in a simple manner by the optically absorbing material having a sufficient (layer) thickness.

The above-described physical parameters absorption coefficient A and transmission coefficient T as well as a reflection and/or backscattering coefficient R relate altogether to the intensity of the according proportions of light. In a known manner, due to the physical law of energy conservation, the following relation holds:

$$A+R+T=1$$

In most of the applications, the described perforated disk must be introduced in the path of rays (or beam path) of an illumination light and/or of a measurement light and be rotated there such that the at least one opening lets individual light rays pass through, respectively, for a short time. For the purpose of a defined rotation, the perforated disk may therefore have a shaft or may be mounted at a shaft and/or have a central opening, which can be fixed to a rotatable shaft. The shaft and/or the opening is preferably located precisely in the center of the perforated disk, such that the latter can be turned and/or rotated around a defined rotation axis by use of a suitable drive system without a mechanical imbalance, such that different passages reach (or end-up) in the path of rays of an optical imaging system one after the other, and let pass determined light rays of a bundle of rays, respectively, for a short time (and block other light rays of the bundle of rays by absorption).

Preferably, the perforated disk has a plurality of openings, of which at least some are arranged at a different radial distance from a center of the perforated disk. Thereby, an object to be captured can be captured by a rotation of the perforated disk in a known manner not only along a (curved) line, but in a two-dimensional area at plural measurement points.

In this document, the expression "illumination light" refers to those light rays, which, starting from a light source, impinge on the object to be captured directly or indirectly (via at least one further optical element, such as for example a lens or a mirror). In contrast to this, in this document, the expression "measurement light" is used for those light rays, which are scattered back from the object to be captured and which impinge on a suitable light detector directly or indirectly.

According to an embodiment, the perforated disk further has a substrate, wherein the optically absorbing material is a coating on the substrate. This has the advantage, that the optically absorbing material can be realized in a simple manner in a suitable spatially embodied structure. The coating may be generated, for example, by a suitable chemical and/or physical vapour phase deposition.

According to a further embodiment, the substrate is an optically transparent substrate.

An optically transparent substrate as a basis material for a coating applied thereon can be of advantage in particular in the manufacturing of the described perforated disk. The at least one opening in the optically absorbing material can be realized during the application (or deposition) of the coating by at least one suitable covering structure, which provides for that no optically absorbing material is deposited at the corresponding position.

In this relation, "optically transparent" may mean a transmissibility for one or plural wavelengths of the light spectrum, wherein this light spectrum is not necessarily limited to the light spectrum that is visible for the human eye. In particular, the optically transparent substrate may be transparent, alternatively or in combination to a transmissivity for visible light, also for infrared radiation and/or ultraviolet radiation.

According to a further embodiment, the substrate has a semiconductor material.

The use of a semiconductor material may be of great advantage in particular for such perforated disks, which have to be manufactured highly-precisely for a high optical imaging precision. Herein, the semiconductor material may stem, for example, from a wafer which is generally used for a manufacture of semiconductor components.

According to a further embodiment, the semiconductor material is silicon. This has the advantage that the substrate can be manufactured particularly cost-efficiently and/or can be purchased by a manufacturer of the perforated disk. Silicon is namely a material, which is used in many other application cases, in particular in the area of electronics manufacturing, and thus is available widespreadly and in high quality.

According to a further embodiment, the substrate has a passage opening (or port) in the area of the at least one opening.

A passage opening is of advantage or eventually even necessary in particular for such substrates, which have an optically at least partially absorbing substrate (material). A passage opening may however also be meaningful in the case of optically perfectly transmissible substrate materials, because also substrate materials that are optically transmissibly at 100% show a reflection coefficient, which is in practice not to be disregarded, at the interface between the air and the substrate due to the differences of the refractive indices of air and substrate material even for a perpendicular incidence of light.

According to a further embodiment, the passage opening has an opening cross-section (or opening cross-sectional area) that changes continuously or discretely and/or stepwisely along a direction parallel to a normal vector of the perforated disk. Herein, the described direction defines in particular a thickness of the perforated disk and/or of the substrate of the perforated disk.

The described continuous change of the opening cross-section may in particular be so strong that at least one sidewall of the passage opening is inclined with respect to the surface of the perforated disk so strongly that no undesired blockings (vignettings), reflections or scatterings of light rays, which pass through the according opening of the perforated disk, occur at this sidewall. Because also such "sidewall scatterings" provide a not unessential contribution to the interfering light, the optical quality of the perforated disk can be improved by suitable passage openings, which deviate from a pure cylinder shape.

According to a further embodiment, the passage opening has the shape of a frustrated cone. A formation of the (at least one) passage opening in the form of a frustrated cone has the advantage that the passage opening can be introduced into the substrate and/or be formed in the substrate with high precision and in a simple manner.

Preferably, in particular frustrated cone-shaped and/or cone-shaped passage openings can be formed by laser drilling. Alternatively or in combination, also etching processes, which are known, for example, from semiconductor technology, can be used for a realization of the at least one passage opening.

According to a further embodiment, the at least one opening has a width between 1 μm and 30 μm, and in particular a width between 2 μm and 10 μm (1 μm=$10^6$ m). Recesses, which are spatially dimensioned in this manner, are of advantage in particular for optical measurement systems, which work in the visible and/or infrared spectral region. The advantage of the described spatial dimensioning consists herein in particular in that the recesses are so large that undesired diffraction effects can be avoided approximately completely. In addition, by a suitably dimensioned recess, a good compromise can be found between (a) a spatial resolution of the selection of light rays and (b) a sufficiently high intensity of light, which can pass through and/or penetrate the corresponding recess. Herein, the sufficiently high light intensity may relate both to an illumination light and also to a measurement light.

The used expression "width of the opening" relates herein in particular to a direction parallel to the surface and/or perpendicular to the normal vector of the surface of the perforated disk. Furthermore, the term "width" may relate to different cross-sectional shapes. In the case of a circular cross-section, the expression "width" relates to the diameter of the corresponding circle. In the case of an elliptical cross-section, the expression "width" relates either to the short semi-axis or to the long semi-axis of the corresponding ellipse. In the case of a rectangular cross-section, the expression "width" may relate to each one of the edge lengths of the corresponding rectangle. For other cross-sectional shapes, for example formed by a polygon, similar or corresponding considerations with respect to the meaning of the expression "width" apply.

According to a further embodiment, the absorption coefficient is greater than 99%, in particular greater than 99.5%, and further in particular greater than 99.95%.

Because the intensity of interfering light becomes less with an increasing absorption, an according higher and/or still higher absorption coefficient results in a further improvement of a measurement system having the described perforated disk. An according high absorption coefficient can be realized for example by a black material having a high surface roughness. Such a material contains for example carbon, which is applied (or deposited) on the substrate of the perforated disk in the form of carbon black (or soot).

According to a further embodiment, the optical absorbing material has carbon nanotubes. Carbon nanotubes can be used in an advantageous manner for the purpose of realizing an optically absorbing material having a particularly high absorption coefficient.

According to a further embodiment, the carbon nanotubes (at least a bigger part) are aligned along a preferred direction (or preferential direction), wherein the preferred direction is oriented in particular parallel to a normal vector of the perforated disk. By carbon nanotubes oriented in this way, the absorption coefficient of the optically absorbing material can be increased further.

According to a further embodiment, the perforated disk further has at least one further opening, wherein the further opening defines a further optical passage, which is greater than the optical passage that is defined by the opening mentioned and introduced above.

The differently sized optical passages may be distributed statistically or homogeneously over at least a greater subportion of the perforated disk or over the whole perforated disk. Alternatively, differently sized optical passages may be assigned to different sub-regions of the perforated disk. In this manner, the described perforated disk may provide different spatial resolutions for an optical imaging.

According to a further embodiment, a plurality of optical passages is present, which have different radial distances in relation to a center point of the perforated disk, wherein (a) for a first radial distance, two neighbouring first optical passages have a first angular distance in relation to the center point, and (b) for a second radial distance, two neighbouring second optical passages have a second angular distance in relation to the center point. If the first distance is greater than the second distance, then the first angular distance is smaller than the second angular distance.

Stated demonstratively, the many optical passages are not arranged on (half) lines that run radially from the center point outwardly and/or star-shapedly outwardly, wherein it holds for all lines that an angular distance between two respective neighbouring lines is equal. In such a case, the distance between two mutually neighbouring optical passages, which have an approximately same radial distance from the center point, would be greater for greater radial distances. In the embodiment described here, this must not be the case, however, because stated demonstratively, a greater number of optical passages is present on a first circle line around the center point with a first radius than on a second circle line around the center point having a second radius, which is smaller than the first radius.

The expression "angular distance" between two mutually neighbouring optical passages having a same radial distance to the center point refers in this document to the angle, which is enclosed between (i) a first (half) line starting from the center point to a first one of the two optical passages and (ii) a second (half) line starting from the center point to the second one of the two optical passages.

The "non-star-shaped" spatial distribution of the optical passages described herein may have in particular the advantage that a greater quantity of light is "collected" for greater radial distances during one turn of the perforated disk without a deterioration of the spatial resolution, such that optical measurement signals having a high signal-to-noise ratio can be recorded by a light detector.

According to a further embodiment, the optical passages are arranged distributed spatially over the perforated disk such that an at least approximately equal signal-to-noise ratio is achievable over a predetermined vision field of the confocal optical imaging. In this way, the capability of an optical imaging system can be improved to capture (quantitatively) with high reliability surface regions of the object, which have reflection properties that deviate from each other. A local adjustment and/or change of the illumination intensity is then not necessary for this purpose.

For achieving a particularly homogeneous signal-to-noise ratio, the number of optical passages, which are arranged at a determined radial distance from the center point of the perforated disk, may be proportional to this radial distance. This may mean that for a constant rotation speed of the perforated disk, the frequency distribution of the optical passages as a function of the radial distance can be a line having a positive inclination.

According to a further embodiment, the perforated disk further has at least one optical window, which is so large that at least a sub-region of the object to be captured is optically imageable through the optical window on a camera, wherein the imageable sub-region of the object is greater than a region of the object, which region is capturable through the optical passage.

Preferably, the perforated disk has two or more of such optical windows. These can be arranged on the perforated disk such that for one whole turn of the perforated disk, the view on at least the sub-region of the object is cleared (or unblocked) without an application of a confocal filtering (through the optical passages).

For one whole turn of the perforated disk, the imaging of an object region then occurs both through at least one optical passage and also through an optical window. The optical window is preferably so wide, along the circumferential direction of the perforated disk, that the amount of light, which impinges through the optical window on a light detector, is equal to or greater than the amount of light that impinges on the light detector through all the optical passages. This relates to those optical passages, which are arranged at the same radial distance range and/or the same radial extension with respect to the center point of the perforated disk as the optical window. In this case, the optical imaging through the optical window "prevails". A confocal filtering through the corresponding optical passages is then effected with a lower amount of light.

The at least two optical windows may be located at opposite sides with respect to a center point of the perforated disk, which coincides with a rotation axis for the perforated disk. Herein, the corresponding spatial arrangement of the windows may be chosen such that an imbalance of the perforated disk is eliminated at least approximatively. Further preferred, such an imbalance may be minimized by the differently sized windows being located at positions that are radially spaced differently from the center point.

Stated demonstratively, a conventional image of the object to be captured can be recorded through the optical window. From such an image, for example the position of the object can be determined, such that it can be verified that in a proper 3D (surface) measuring of the object through the at least one optical passage also in fact the object to be captured and/or the sub-region to be in fact captured of the object to be captured is measured.

The described optical window is defined by at least one gap of a corresponding size in the optically absorbing material. As a function of the optical transmissivity of the substrate material, on which the optically absorbing material is applied, also a correspondingly large passage opening in the corresponding substrate may be associated to the described optical window.

As a function of the shape and the size of the object (or sub-region of the object) to be captured by the camera, the optical window may have a suitable geometry and/or size. Only by way of example, the following shapes shall be mentioned here: rectangle, slit, circle, ellipse, sector of a circle, sector of a circular ring (of the perforated disk).

The described optical window may be arranged radially offset, with respect to a center point of the perforated disk, in comparison to the at least one optical passage and/or in comparison to the at least one further optical passage. Thereby, a capturing of at least a sub-region of the object to be captured can be effected optically separated from a capturing of a 3D surface topography (through the at least one optical passage and/or the at least one further optical passage). Alternatively or in combination, the at least one optical window may also be arranged offset along a circumferential direction with respect to the at least one optical passage and/or with respect to the at least one further optical passage.

According to a further embodiment, the perforated disk has a plurality of openings and/or optical passages and at least three different sectors of a circle, wherein (a) in a first sector of the circle, the openings are arranged with a first spatial distribution, (b) in a second sector of the circle, the openings are arranged with a second spatial distribution, and (c) in the third sector of the circle, the openings are arranged with a third spatial distribution. Along a circumferential direction of the perforated disk, the second sector of the circle is located between the first sector of the circle and the third sector of the circle. Furthermore, the first spatial distribution and the third spatial distribution are different with respect to the second spatial distribution. Preferably, the first spatial distribution is the same as the third spatial distribution. By such a "sectorization", the homogeneity of the illumination of a light detector of a (confocal) optical imaging system can be improved in an advantageous manner.

The mentioned sectors of the circle may also be referred to as circular sections.

In this document and in particular in this relation, the expression "spatial distribution" may relate to the positions and/or the number, the frequency of occurrence and/or the density (=number of openings and/or optical passages per unit area) of the openings.

It is pointed out that the perforated disk may also have more than three sectors, wherein the number of the sectors is in particular a multiple of three. It is further pointed out that for the case that the perforated disk has at least one optical window, as described hereinbefore, this optical window is located preferably in a further circular section, which is different from the mentioned (at least three) circular sectors.

According to a further aspect, there is described an optical imaging system for capturing the three-dimensional structure of an object to be captured. The described optical imaging system has (a) a light source for emitting an illumination light, and (b) a perforated disk according to any one of the preceding claims (or as described above), which perforated disk selects individual light rays (or light beams) of the illumination light by the at least one optical passage thereof, and absorbs other light rays of the illumination light by the optically absorbing material. If the object to be captured is located in a spatial capturing region of the optical imaging system, the selected light rays impinge on the surface of the object and are scattered at the latter, wherein at least a part of the scattered light rays penetrates through the at least one optical passage as a measurement light. The described optical imaging system further has (c) a light detector for receiving the measurement light.

The optical imaging system described herein is based on the insight that the above-described perforated disk may effect a significant contribution to reduce to a minimum the amount and/or the intensity of interfering light, which impinges on the light detector, due to the extremely strong absorption thereof.

The expression "selecting of light rays" is to be understood in this document to the extent that only those light rays are used for a generation of measurement signals, which light rays pass through the at least one optical passage. This means that non-selected light rays are kept away from the light detector and thus do not contribute to the proper measurement signal.

According to an embodiment, the optical imaging system further has (a) a first optical system, which is located in a first optical path between (i) the light source and/or the light receiver and/or (ii) the perforated disk; and (b) a second optical system, which is located in a second optical path between (i) the perforated disk and (ii) the spatial capturing region of the optical imaging system.

The first optical system and/or the second optical system, each of which may have one or more optical elements, such as for example lenses, mirrors, prisms, etc., may be arranged with respect to the perforated disk and/or may have such a focusing effect, in particular by light diffraction, such that the perforated disk is located in a focal point of the light rays of the illumination light and/or the measurement light. Further, the light source and the light detector can be arranged confocally relative to each other. This means that by the first optical system (i) on the one hand a light point of the light source is imaged (or mapped) sharply on a plane, in which the at least one opening of the perforated disk is located, and (ii) on the other hand the (edges of the) opening are imaged sharply on the light receiver. Herein, the first optical path and the second optical path each define at least a part of an optical path, along which both the illumination light and the measurement light propagates.

With the optical imaging system defined according to the embodiment example described herein, a confocal microscope can be realized, which shows a high signal-to-noise ratio due to the extremely high absorption by the optically absorbing material of the perforated disk and thus has a high measurement accuracy, in particular for a determination of 3D surface topographies.

According to a further embodiment, the optical imaging system further has a rotary drive having a stationary component and a rotatable component, wherein the perforated disk is mechanically coupled to the rotatable component. Herein, the stationary component may also be referred to as the stator, and the rotatable component may also be referred to as the rotor of the rotary drive. The rotation is effected in particular about a rotation axis, which is oriented perpendicular to the areal extension of the perforated disk and/or parallel to a normal vector of the perforated disk.

By a rotation of the perforated disk, plural points on the surface of the object to be captured can be scanned sequentially with each single optical passage. By a data processing device, which is in-line downstream of the light detector, the according measurement signals, which are associated to respectively one (angle) position of an optical passage and the radial distance thereof from the rotation axis, can be assembled to an image of the object to be captured, which image represents a 3D surface topography of the object.

Further advantages and features of the present disclosure result from the following exemplary description of presently preferred embodiments. The individual figures of the drawings of this document are only schematic and are not to be considered as being to scale.

SHORT DESCRIPTION OF THE DRAWINGS

DETAILED DESCRIPTION

Figure 1:
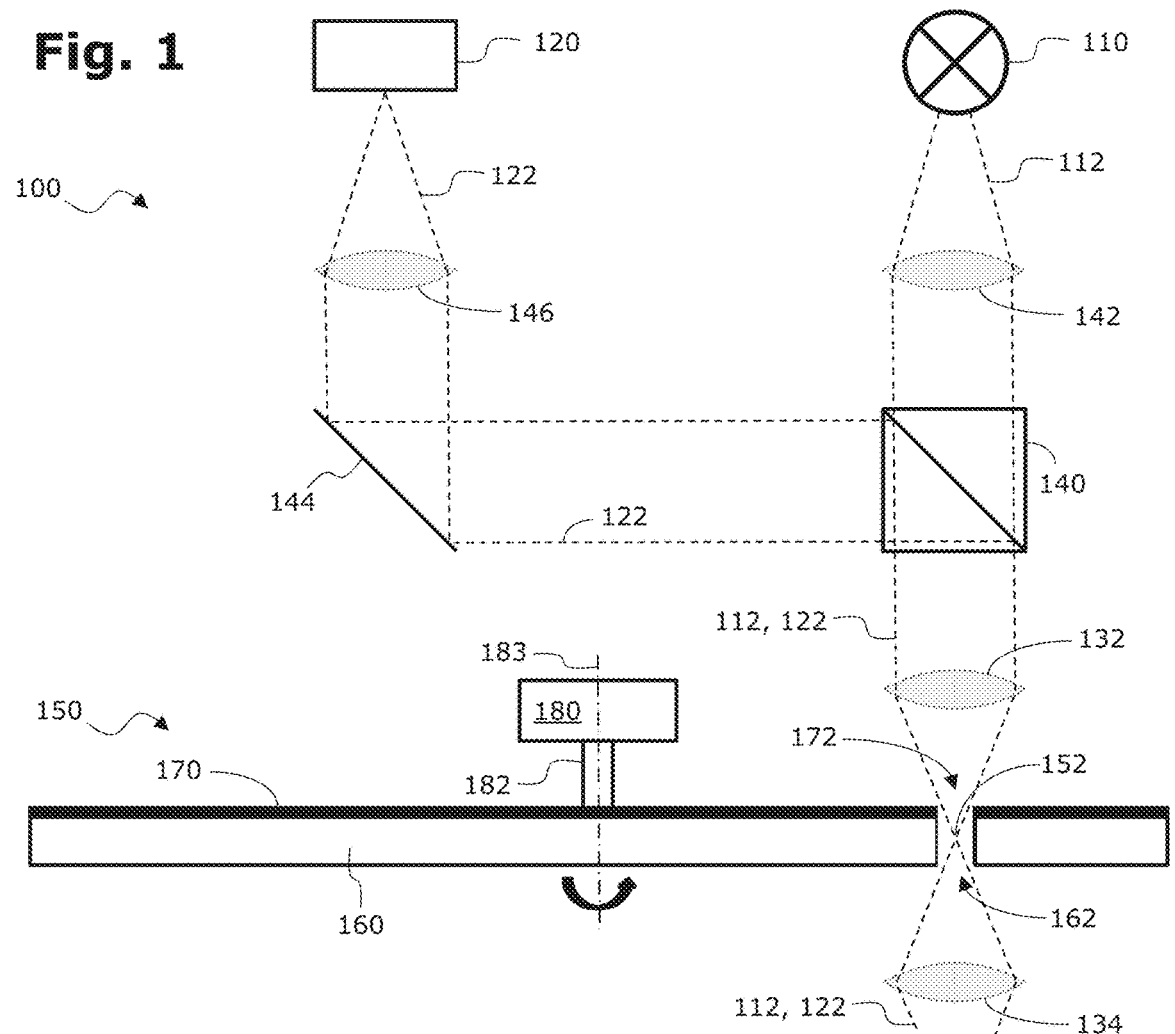
FIG. 1 shows a confocal optical imaging system having a rotatable perforated disk for measuring the three-dimensional surface of an object, wherein the perforated disk has a substrate and an optically absorbing material with carbon nanotubes applied thereon.

It is pointed out that in the following detailed description, features and/or components of different embodiments, which are equal or at least functionally equal to the corresponding features and/or components of another embodiment, are provided with the same reference numerals or with reference numerals, which are identical in the last two ciphers to the reference numerals of corresponding same or at least functionally same features and/or components. For avoiding unnecessary repetitions, features and/or components, which have been explained already with respect to a previously described embodiment, are not explained any more in detail at a later position.

Furthermore, it is pointed out that the embodiments described in the following represent only a limited selection of possible embodiment variants of the invention. In particular, it is possible to combine the features of individual embodiments with each other in a suitable manner, such that for a skilled person having the embodiment variants represented explicitly herein, a plurality of different embodiments is to be considered as obviously disclosed.

Furthermore, it is pointed out that space-related expressions, such as for example "in front" and "behind", "at the top" and "at the bottom", "left" and "right", etc., are used to describe the relation of one element to another element or to other elements as it is illustrated in the figures. Accordingly, the space-related terms may hold for orientations (or alignments), which differ from the orientations (or alignments) that are represented in the figures. It is to be understood in itself that all such space-related expressions relate to the orientations represented in the drawings for simplicity of the description and are not necessarily limiting, because the respectively illustrated device, component, etc., when they are in use, may attain orientations, which can be different from the orientations represented in the drawings.

FIG. 1 shows a confocal optical imaging system 100 for three-dimensionally measuring a surface 192 of an object 190. The optical imaging system 100 has a perforated disk 150, which is located in a common first focal point 152 of both (i) an illumination light 112 and also (ii) a measurement light 122. Stated more precisely, the common first focal point 152 is defined by the spatial course and/or the focusing of the corresponding light rays of the illumination light 112 and/or the measurement light 122. The first focal point 152 is herein located at the position, at which the cross-section (of the light rays) of the illumination light 112 as well as the measurement light 122 is the smallest.

The illumination light 112 is generated by a light source 110. According to the embodiment example represented here, the illumination light 112 is initially transformed by an optical system 142, for example a simple lens, to a parallel light bundle. This light bundle then passes (in a straight direction) through a beam splitter 140 before it is focused by a first optical system 132 on the mentioned first focal point 152. A passage opening 162 that acts as a pinhole (or aperture) takes care that only those light rays pass the perforated disk 150 with a significant intensity, which light rays are focused in the first focal point 152. Behind this first focal point 152, the light bundle of the illumination light 112 widens up again and impinges on a second optical system 134. The second optical system 134, which may also be a single lens, focuses the illumination light 112 on a second focal point 154, which is located in the vicinity of the surface 192 to be measured.

The illumination light 112 that impinges on the object 190 is scattered at least partially at the surface 192 of the object 190. From this scattering light, only a comparably small part reaches a light detector 120 as measurement light 122. Herein, the optical ray path of this (backscattered) measurement light 122 extends initially via (a) the second optical system 134, (b) the pinhole in the perforated disk 150 defined by the passage opening 162, and (c) the first optical system 132. Thereafter, the measurement light 122, which has been transformed by the first optical system 132 to a parallel bundle of rays, impinges on the beam splitter 140. By this beam splitter, the parallel measurement light 122 is deflected by 90°, such that it impinges on a reflector 144, which is for example an inclined mirror. At the reflector 144, the parallel measurement light 122 is deflected again by 90°, and thereby impinges on an optical system 146, which deflects the measurement light to a determined measurement point and/or a determined pixel of the light detector 120.

According to the embodiment example represented here, during the measurement, the object 190 is moved back and forth along a displacement direction 190a (relative to the optical imaging system 100). Alternatively, also the second optical system 134 may be moved or adjusted (relatively to the other components of the optical imaging system 100). Furthermore, also the whole confocal imaging system 190 may be moved relatively to the object 190. The according displacement movement is illustrated by a double arrow 190a. An (oscillating) displacement of the object 190 about the second focal point 154 results in that the bundle of rays of the illumination light 112 impinges on the surface 192 with a different cross-section. Due to the optically confocal arrangement, the following holds (or applies) with respect to the intensity of measurement light 122 that is backscattered from the surface 192 and/or more precisely the intensity of the measurement light 122, which impinges on the light detector 120: this intensity is the largest if the second focal point 154 coincides precisely with a point of the surface 192. If the bundle of rays of the measurement light 112 impinges on the surface 192 with an increased cross-section, then the portion of light that is backscattered at the surface 192, which portion passes through the opening and/or the optical passage 172 of the perforated disk 150 and impinges on the light detector 120 as measurement light 122, is accordingly smaller. By an evaluation of the intensity of the measured (or recorded) measurement light 122 as a function of the distance between the object 190 and the perforated disk 150, the height level and/or the distance of the corresponding measurement point of the surface 190 in relation to the optical imaging system 100 can be determined. By a rotation of the perforated disk 150 around the rotation axis 183, different measurement points on the surface 192 can be captured, and thus the three-dimensional height profile of the surface 192 can be measured.

Even for a careful choice as well as positioning of all optical components involved, it is not possible to avoid by 100% that undesired interfering light impinges on the light detector 120. A particularly strongly disturbing interfering light is generated by illumination light 112, which impinges on the perforated disk 150 outside of the passage opening 162, being reflected back and impinging on the light detector 120 via the optical components first optical system 132, beam splitter 140, reflector 144 and optical system 146.

The intensity of this scattered light is reduced in an effective manner to a minimum in that the (in FIG. 1 upper) surface of the perforated disk 150 is provided with a particularly strongly optically absorbing material 170, which has an absorption coefficient of at least 98%. According to the embodiment example represented here, the optically absorbing material 170 is applied on a substrate 160, which consists of a semiconductor material, in particular silicon. The above-described pinhole of the perforated disk 150 is realized in that an opening 172 is present in the optically absorbing material 170, which opening coincides spatially with the passage opening 162 mentioned above. The opening 172 and the passage opening 162 thus define an optical passage, which represents the above-described pinhole (or aperture).

According to the embodiment example illustrated here, the optically absorbing material 170 contains carbon nanotubes, which result in a particularly high optical absorption on the upper side of the perforated disk 150. In order to further increase this absorption, the carbon nanotubes are aligned, in a non-represented manner, along a preference direction, which is oriented parallel to a normal vector of the surface of the perforated disk 150.

As has been mentioned already above and as is known from conventional confocal optical imaging systems, the perforated disk 150 is rotatable about a rotation axis 183. For this purpose, the perforated disk 150 is connected via a shaft 182 to a rotary drive 180. Upon an activation of the rotary drive, the perforated disk 150 rotates about the rotation axis 183. In result of this, the optical passage 162, 172 "travels" in a plane perpendicular to the rotation axis 133, such that different surface points of the object 190 can be scanned in a known manner and/or, more precisely, the distance thereof to the perforated disk 150 can be measured.

It is pointed out that, in deviation to the structural assembly of the confocal optical imaging system 100 illustrated in FIG. 1, the following modifications can be applied:

(A) The illumination light is not focused, but is directed on the perforated disk as an at least approximately parallel light bundle. This means, that the illumination light is, for a defined distance of the object, not focused on the surface of the object, but generates a more or less large illumination spot on the surface of the object.

(B) The illumination light is coupled, by (or via) the beam splitter, into the path of rays of the measurement light. In an according manner, the measurement light that impinges on the light detector penetrates the beam splitter without a deflection (by 90°). Stated demonstratively, with reference to FIG. 1, the light source 110 and the light detector 120 are interchanged in respect of their spatial arrangement.

Figure 2:
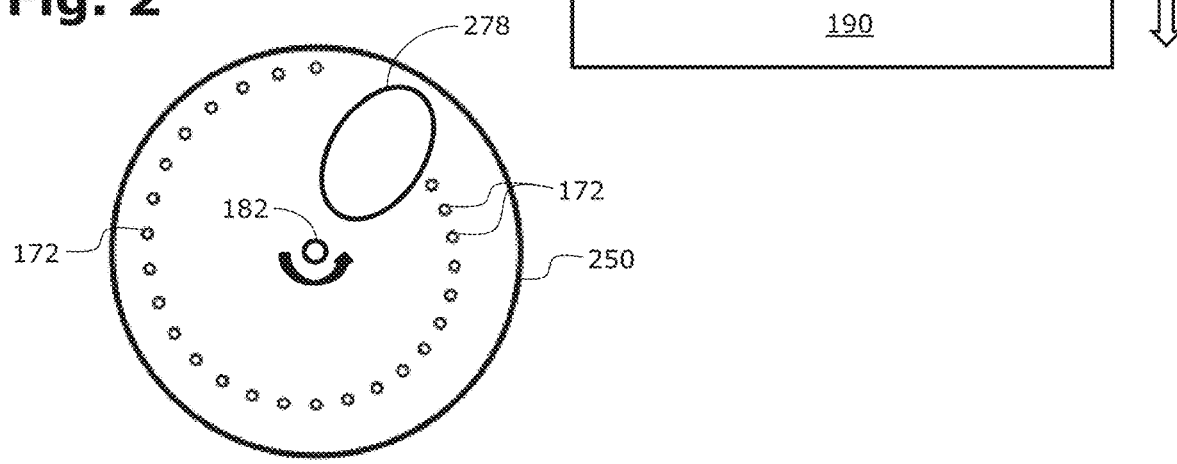
FIG. 2 shows a perforated disk formed as a Nipkov-disk having an optical window for recording (or receiving) a two-dimensional image of the object through the perforated disk.

FIG. 2 shows a perforated disk 250, which is formed as a so-called Nipkov-disk, and which has an optical window 278 for recording a two-dimensional image of an object through the perforated disk 250. The perforated disk 250 has (in a known manner) a plurality of optical passages 172, each of which serve as a small pinhole, and which are arranged on a spiral line around a center point of the perforated disk 250. In FIG. 2, this center point coincides with the shaft 182.

According to the embodiment example represented here, the perforated disk 250 has, in addition to the plurality of optical passages 172, a comparably large optical window 278. At least a part of the corresponding object can be captured by a 2D image recording through this optical window. In result of this, it can be verified on the basis of a simple image of the object, or at least a part of the corresponding object, that the object to be captured and/or the sub-region of the object to be captured is located at a correct position, such that also in fact the correct surface region of the object is measured three-dimensionally in the manner described above.

Figure 3:
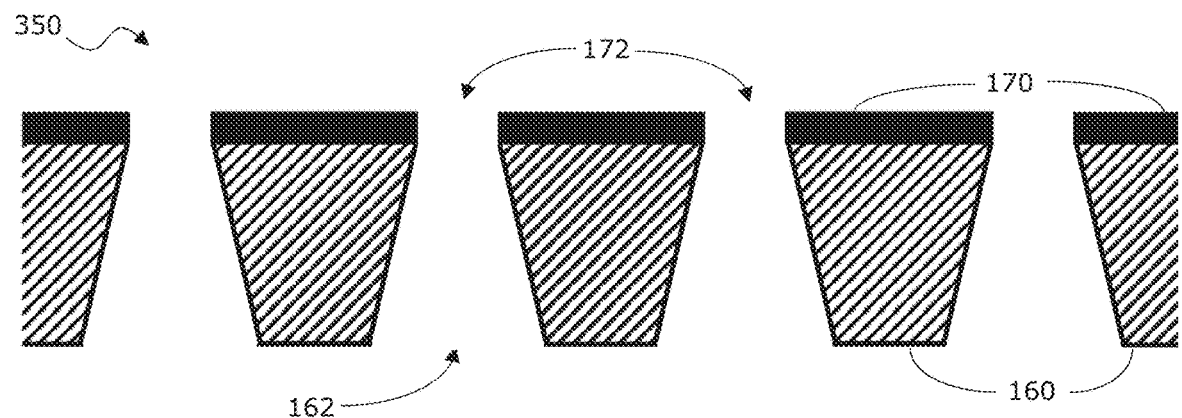
FIG. 3 shows a portion (or section) of a perforated disk in a cross-sectional view.

FIG. 3 shows, in a cross-sectional view, a section of a perforated disk 350 according to a further embodiment example of the present disclosure. Also the perforated disk 350 has a substrate 160 as well as a layer of an optically strongly absorbing material 170 formed on the substrate 160. Carbon nanotubes in the optically absorbing material 170, which are suitably aligned, take care for a particularly high absorption at the surface of the perforated disk 350. In order to additionally avoid an undesired generation of interfering light by a scattering at the sidewalls of the optical passages 162, 172, the optical passages 162, 172 have a conical shape. Herein, the cross-section of the optical passages 162, 172 at the side, at which the optically absorbing material 170 is located, is smaller than the cross-section at the opposite side of the perforated disk 350. Alternatively or in combination, the optically absorbing material may also be applied on that side of the substrate, at which the conical optical passages have the larger cross-section.

Figure 4:
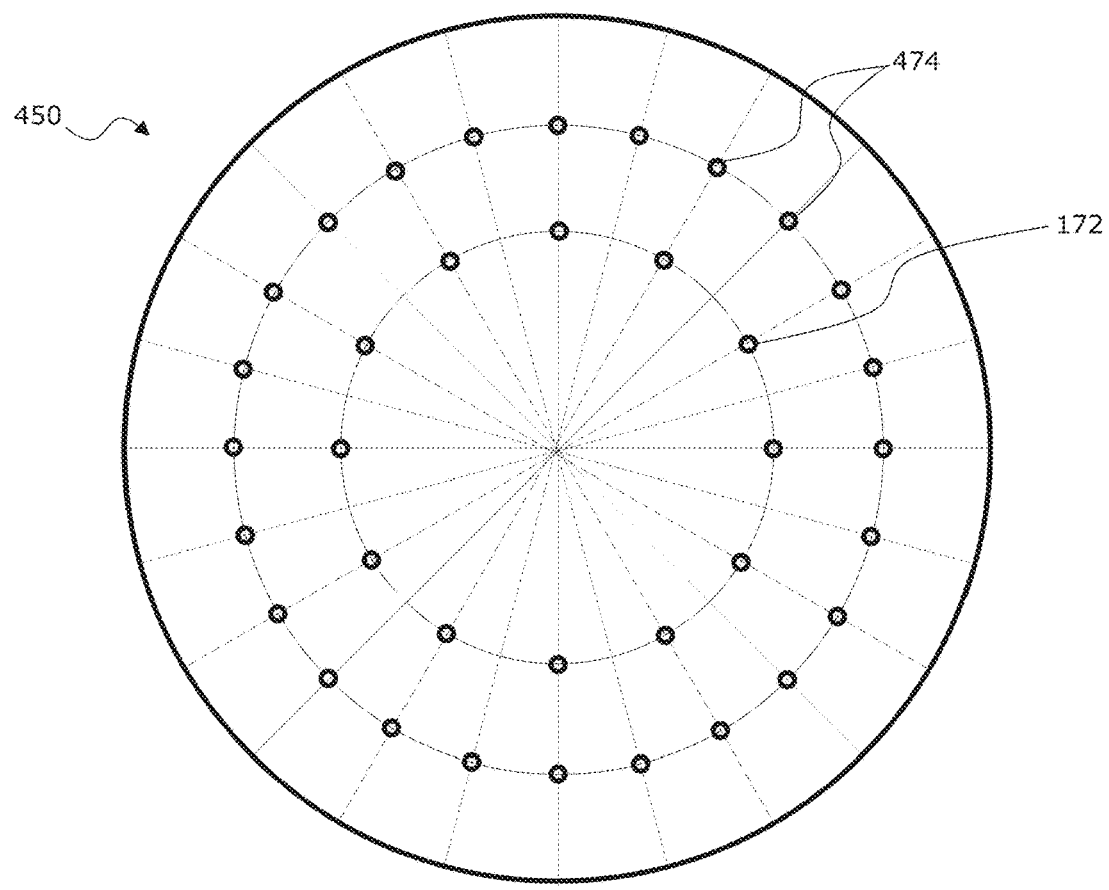
FIG. 4 shows a perforated disk having a plurality of optical passages, wherein the number of optical passages is greater for a greater radial distance from a center point of the perforated disk than the number of optical passages at a smaller radial distance.

FIG. 4 shows a perforated disk 450 having a plurality of optical passages 172 and a plurality of further optical passages 474. According to the embodiment example represented here, the further optical passages 474 are spaced further away from a center point of the perforated disk 450 than the optical passages 172. In order to prevent that a spatial density of optical passages in a radially outer portion of the perforated disk 150 is significantly smaller than in a radially inner portion of the perforated disk 150, the number of (outer) further optical passages 474 is higher than the number of (inner) optical passages 172. In order to clarify this, auxiliary lines, which start radially from the center point of the perforated disk 450 are drawn in FIG. 4, from which auxiliary lines it can be seen that the angle distance between two neighbouring (inner) optical passages 172 is two times as large as the angle distance between two neighbouring (outer) further optical passages 474. This means that according to the embodiment example represented here, the number of the (outer) further optical passages 474 is two times as high as the number of the (inner) optical passages 172. By such a "non-star-shaped" spatial distribution of the optical passages 172, 474, a greater or at least equally great amount of light can be "collected" during one turn of the perforated disk 450 without a deterioration of the spatial resolution for larger radial distances, with respect to the (inner) optical passages 172. In result of this, measurement signals, which have a large and in the vision field of the confocal imaging at least approximately same signal-to-noise ratio, can be recorded by the light detector 120 represented in FIG. 1.

Alternatively to or in combination with such a distribution of the number of optical passages, which depends from the radial distance to the center point of the perforated disk, also the size and/or the diameter of the optical passages may vary spatially, and may in particular depend from the spatial distance to the center point of the perforated disk. In this way, for example, the diameters of the optical passages for outer passages may be greater than for inner passages.

It is noted that the expression "having" does not exclude other elements, and that "an" or "a" does not exclude a plurality. Also, elements, which have been described in relation with different embodiment examples, can be combined. It should also be noted that reference numerals in the claims shall not be construed as limiting the scope of protection of the claims.

REFERENCE NUMERALS

100 confocal optical imaging system
110 light source
112 illumination light
120 light detector
122 measurement light
132 first optical system
134 second optical system
140 beam splitter
142 optical system
146 optical system
150 perforated disk
152 first focal point
154 second focal point
160 substrate
162 passage opening/optical passage
170 optically absorbing material
172 opening/optical passage
180 rotary drive
182 shaft
183 rotation axis
190 object (to be captured)
190a displacement movement
192 surface
250 perforated disk
278 optical window
350 perforated disk
450 perforated disk
474 further opening/further optical passage

The invention claimed is:

1. A perforated disk for selecting light for an optical imaging in a confocal imaging system, the perforated disk having:
a substrate,
an optically absorbing material which has an absorption coefficient of at least 98%, wherein at least one opening is present in the optically absorbing material, which opening defines an optical passage through the perforated disk,
wherein the substrate has a passage opening in the region of the at least one opening,
wherein the passage opening has an opening cross-section which changes continuously or discretely along a direction parallel to a normal vector of the perforated disk, and
wherein in case of a continuously changing opening cross-section, at least one sidewall of the passage opening is inclined with respect to the surface of the perforated disk so strongly that blockings, reflections or scatterings of light rays, which pass through the according opening of the perforated disk, are minimized at this sidewall.

2. The perforated disk according to claim 1, wherein the optically absorbing material is a coating on the substrate.

3. The perforated disk according to claim 2, wherein the substrate is an optically transparent substrate.

4. The perforated disk according to claim 1, wherein the substrate has a semiconductor material.

5. The perforated disk according to claim 4, wherein the semiconductor material is silicon.

6. The perforated disk according to claim 1, wherein the passage opening has the shape of a truncated cone.

7. The perforated disk according to claim 1, wherein the at least one opening has a width between 1 µm and 30 µm.

8. The perforated disk according to claim 1, wherein the absorption coefficient is greater than 99.

9. The perforated disk according to claim 1, wherein the optically absorbing material has carbon nanotubes.

10. The perforated disk according to claim 9, wherein the carbon nanotubes are aligned along a preferred direction, wherein the preferred direction is oriented parallel to a normal vector of the perforated disk.

11. The perforated disk according to claim 1, further having at least one further opening, wherein the further opening defines a further optical passage, which is greater than the optical passage.

12. The perforated disk according to claim 11, wherein a plurality of optical passages are present, which have different radial distances with respect to a center point of the perforated disk, wherein
   (a) for a first radial distance, two neighbouring first optical passages have a first angular distance in respect of the center point, and
   (b) for a second radial distance, two neighbouring second optical passages have a second angular distance in respect of the center point,
   wherein if the first distance is greater than the second distance, the first angular distance is smaller than the second angular distance.

13. The perforated disk according to claim 1, wherein the optical passages are arranged spatially distributed over the perforated disk such that an at least substantially equal signal-to-noise ratio is achieved across a predetermined field of view of the confocal optical imaging.

14. The perforated disk according to claim 1, further having at least one optical window, which is so large that at least a sub-region of an object to be captured is imageable through the optical window onto a camera, wherein the imageable sub-region of the object is greater than a region of the object, which region is capturable through the optical passage.

15. The perforated disk according to claim 1,
   wherein the perforated disk has a plurality of openings and at least three different sectors of a circle,
   wherein in a first sector, the openings are arranged with a first spatial distribution, in a second sector, the openings are arranged with a second spatial distribution, and
   in the third sector, the openings are arranged with a third spatial distribution, wherein along a circumferential direction of the perforated disk, the second sector is located between the first sector and the third sector, and
   the first spatial distribution and the third spatial distribution are different from the second spatial distribution, and the first spatial distribution is equal to the third spatial distribution.

16. An optical imaging system for capturing the three-dimensional structure of an object, the optical imaging system having:
   a light source for emitting an illumination light;
   a perforated disk according to claim 1, which perforated disk selects individual light beams of the illumination light by its at least one opening, and absorbs other light beams of the illumination light by the optically absorbing material, wherein, if the object to be captured is located in a spatial capturing region of the optical imaging system, the selected light beams impinge on the surface of the object and are scattered at the same, wherein at least a part of the scattered light beams pervades through the at least one optical passage as a measurement light; and
   a light detector for receiving the measurement light.

17. The optical imaging system according to claim 16, further having:
   a first optical system, which is located in a first optical path between (i) the light source and/or the light detector and (ii) the perforated disk; and
   a second optical system, which is located in a second optical path between (i) the perforated disk and (ii) the spatial capturing region of the optical imaging system.

18. The optical imaging system according to claim 16, further having a rotary drive having a stationary component and a rotatable component, wherein the perforated disk is mechanically tied to the rotatable component.

* * * * *

UNITED STATES PATENT AND TRADEMARK OFFICE
CERTIFICATE OF CORRECTION

| | |
|---|---|
| PATENT NO. | : 11,802,761 B2 |
| APPLICATION NO. | : 17/251758 |
| DATED | : October 31, 2023 |
| INVENTOR(S) | : Dennis Frank Jansen et al. |

It is certified that error appears in the above-identified patent and that said Letters Patent is hereby corrected as shown below:

In the Claims

In Column 15, Line 14, in Claim 8, delete "99." and insert -- 99%. --.

Signed and Sealed this
Twentieth Day of February, 2024

*Katherine Kelly Vidal*

Katherine Kelly Vidal
*Director of the United States Patent and Trademark Office*